US012668352B2

(12) United States Patent
Gitnes

(10) Patent No.: US 12,668,352 B2
(45) Date of Patent: Jun. 30, 2026

(54) MULTIPLE LOAD PATH ACTUATOR WITH FAULT DETECTION

(71) Applicant: Moog Inc., East Aurora, NY (US)

(72) Inventor: Seth E. Gitnes, Snohomish, WA (US)

(73) Assignee: Moog Inc., East Aurora, NY (US)

( * ) Notice: Subject to any disclaimer, the term of this patent is extended or adjusted under 35 U.S.C. 154(b) by 0 days.

(21) Appl. No.: 18/028,732

(22) PCT Filed: Oct. 5, 2021

(86) PCT No.: PCT/US2021/053465
§ 371 (c)(1),
(2) Date: Mar. 27, 2023

(87) PCT Pub. No.: WO2022/076340
PCT Pub. Date: Apr. 14, 2022

(65) Prior Publication Data
US 2023/0332676 A1 Oct. 19, 2023

Related U.S. Application Data

(60) Provisional application No. 63/088,761, filed on Oct. 7, 2020.

(51) Int. Cl.
*B64C 5/16* (2006.01)
*B64C 13/28* (2006.01)
*F16H 25/20* (2006.01)

(52) U.S. Cl.
CPC ............. *B64C 5/16* (2013.01); *F16H 25/205* (2013.01); *B64C 13/341* (2018.01); *F16H 2025/2053* (2013.01); *F16H 2025/2081* (2013.01)

(58) Field of Classification Search
CPC ........... F16H 25/205; F16H 2025/2023; F16H 2025/2081; B64C 13/341; B64C 9/02
See application file for complete search history.

(56) References Cited

U.S. PATENT DOCUMENTS 3,038,352 A * 6/1962 Murphy ............... G05D 1/0061
475/2
3,159,046 A 12/1964 Harned et al.
(Continued)

FOREIGN PATENT DOCUMENTS

DE 10234738 B4 3/2005
EP 0283548 A1 9/1988
(Continued)

OTHER PUBLICATIONS

"Book 2, Chapter 22: Synchronizing cylinder movement", Dec. 5, 2010, Powermotiontech.com (Year: 2010).*

*Primary Examiner* — Joshua D Huson
(74) *Attorney, Agent, or Firm* — Harter Secrest & Emery LLP

(57) ABSTRACT

An actuator comprising first and second motors, first and second drive linkages, and a pivot mount configured to pivot about a pivot axis, the pivot mount connected to the first and second drive linkages at first and second mount connections offset first and second offset distances from the pivot axis, the motors and first and second drive linkages configured to provide first and second load paths between a drive housing and the pivot mount so that in a first operation state the pivot mount is in a force-balanced orientation about the pivot axis, and a proximity detector positioned to detect when the pivot mount rotates about the pivot axis above a threshold out of the force-balanced orientation, wherein a force imbalance on the pivot mount caused by a fault in one of the first or second drive linkages above a threshold is detected by the proximity detector.

26 Claims, 4 Drawing Sheets

(56)                    References Cited

U.S. PATENT DOCUMENTS

|  |  |  |  |  |
|---|---|---|---|---|
| 4,398,242 | A | 8/1983 | Buus | |
| 4,800,798 | A | 1/1989 | Boldrin et al. | |
| 7,021,587 | B1 | 4/2006 | Younkin | |
| 7,604,200 | B2 | 10/2009 | Laja | |
| 7,946,529 | B2 | 5/2011 | Moalic et al. | |
| 8,224,502 | B2 | 7/2012 | Brueckner et al. | |
| 8,457,836 | B2 | 6/2013 | Balasu et al. | |
| 8,814,085 | B2 | 8/2014 | Richter et al. | |
| 8,944,372 | B2 | 2/2015 | Moulon et al. | |
| 8,960,031 | B2 | 2/2015 | Keech et al. | |
| 9,366,324 | B2 | 6/2016 | Huang et al. | |
| 10,066,715 | B2 | 9/2018 | Larson et al. | |
| 2008/0149762 | A1* | 6/2008 | Baker | B64C 9/02 |
| | | | | 244/87 |
| 2008/0203223 | A1 | 8/2008 | Cyrot et al. | |
| 2011/0041632 | A1 | 2/2011 | Baker et al. | |
| 2014/0290403 | A1* | 10/2014 | Wu | F16H 25/2056 |
| | | | | 74/89.35 |
| 2014/0360348 | A1* | 12/2014 | Kopp | F15B 15/06 |
| | | | | 91/159 |
| 2016/0312867 | A1* | 10/2016 | Larson | F16H 25/205 |
| 2018/0155010 | A1 | 6/2018 | Gianfranceschi | |
| 2019/0063568 | A1 | 2/2019 | Laskovy et al. | |
| 2020/0172229 | A1 | 6/2020 | Polcuch et al. | |
| 2020/0290729 | A1 | 9/2020 | Charafeddine et al. | |

FOREIGN PATENT DOCUMENTS

|  |  |  |  |
|---|---|---|---|
| EP | 3330570 | A1 | 6/2018 |
| FR | 3055383 | A1 | 3/2018 |
| WO | 2011096913 | A1 | 8/2011 |
| WO | 2013120036 | A1 | 8/2013 |
| WO | 2019102119 | A1 | 5/2019 |

* cited by examiner

MULTIPLE LOAD PATH ACTUATOR WITH FAULT DETECTION

TECHNICAL FIELD

The present invention relates generally to the field of actuators, and more specifically to an actuator having dual load paths and fault detection.

BACKGROUND ART

Horizontal stabilizer trim actuators (HSTAs) are known in the art. U.S. Pat. No. 4,637,272 is directed to an actuation system that uses a common ball screw in primary and secondary load paths. U.S. Pat. No. 6,755,375 is directed to an actuation system with two independent actuators acting between a common support and a common flight control surface. U.S. Pat. No. 4,179,944 is directed to an actuation system that provides for an actuator to be freed following a jam of a ball screw assembly.

Screw drive actuators are also known in the art and generally include a screw in threaded engagement with a nut and driven by a motor. Relative rotation between the screw and the nut produces axial displacement between the screw and the nut.

SUMMARY

With parenthetical reference to the corresponding parts, portions or surfaces of the disclosed embodiment, merely for the purposes of illustration and not by way of limitation, the present disclosure provides an actuator assembly (15) configured to impart a range of motion to a driven object (18) relative to a structure (16) comprising: a first sub-actuator (30) having a first motor (31) and a first drive linkage (35) configured to be driven linearly relative to a drive housing (80); a second sub-actuator (60) comprising a second motor (61) and a second drive linkage (65) configured to be driven linearly relative to the drive housing (80); a pivot mount (81) connected to both the first drive linkage (35) and the second drive linkage (65) and configured to pivot about a pivot axis (82); the pivot mount (81) connected to the first drive linkage (35) at a first mount connection (38) offset a perpendicular first offset distance (39) from the pivot axis (82); the pivot mount (81) connected to the second drive linkage (65) at a second mount connection (68) offset a perpendicular second offset distance (69) from the pivot axis (82); the first motor (31) and the first drive linkage (36) configured to provide a first load path between the drive housing (80) and the pivot mount (81); the second motor (61) and the second drive linkage (65) configured to provide a second load path between the drive housing (80) and the pivot mount (81) that is different from the first load path; the first mount connection (38) supporting the first drive linkage (35) and the second mount connection (68) supporting the second drive linkage (65) so that in a first operation state the pivot mount (81) is in a force-balanced orientation (FIG. 3) about the pivot axis (82); a proximity detector (40, 41, 70) positioned to detect when the pivot mount (81) rotates about the pivot axis (82) above a rotational threshold out of the force-balanced orientation (FIG. 4); and wherein a force imbalance on the pivot mount (81) caused by a fault in one of the first drive linkage or the second drive linkage above a fault threshold is detected by the proximity detector (40, 41, 70).

The proximity detector may comprise a contact detector configured so that a force imbalance caused by a fault in one of the first or second drive linkages above the fault threshold causes the pivot mount (81) to rotate out of the force-balanced orientation above the rotational threshold and to contact the contact detector, thereby detecting the fault. The actuator assembly may comprise a driven object (18) connected to the pivot mount (81) and the proximity detector may comprise a proximity sensor (40, 70) disposed on either the pivot mount or the driven object and a sensor target (41) disposed on the other of the pivot mount or the driven object.

The first drive linkage may comprise a first screw drive (35) and the second drive linkage may comprise a second screw drive (65). The first motor (31) may be configured to selectively rotate the first screw drive (35) and the second motor (61) may be configured to selectively rotate the second screw drive (65). The first screw drive (35) may comprise a first output piston (36) connected to the pivot mount (81) at the first mount connection (38) and translationally supported by the drive housing (80); the first screw drive (35) may comprise a first shaft (37) rotationally supported by the drive housing (80); the first output piston (36) may be in engagement with the first shaft (37) such that the first output piston (36) translates within a linear range of motion axially on a first center axis (37A) relative to the first shaft (37) and the drive housing (80) in response to relative rotation between the first shaft (37) and the first output piston (36) about the first center axis (37A); and the first motor may be configured to drive rotation of the first shaft (37) about the first center axis (37A) relative to the drive housing (80). The second screw drive (65) may comprise a second output piston (66) connected to the pivot mount (81) at the second mount connection (68) and translationally supported by the drive housing (80); the second screw drive may comprise a second shaft (67) rotationally supported by the drive housing (80); the second output piston (66) may be in engagement with the second shaft (67) such that the second output piston (66) translates within a linear range of motion axially on a second center axis (67A) relative to the second shaft (67) and the drive housing (80) in response to relative rotation between the second shaft (67) and the second output piston (66) about the second center axis (67A); and the second motor (61) may be configured to drive rotation of the second shaft (67) about the second center axis (67A) relative to the drive housing (80). The first center axis (37A) and the second center axis (67A) may be substantially parallel. The pivot axis (82) and the first center axis (37A) may be substantially perpendicular. The first offset distances (39) may be substantially the same distance as the second offset distance (69).

The first motor (31) may be connected to both the first drive linkage (35) and the second drive linkage (65) so that in the first operation state the first motor (31) selectively drives the pivot mount (81) relative to the drive housing (80) via the first load path and the second load path; and the second motor (61) may be connected to both the first drive linkage (35) and the second drive linkage (65) so that in the first operation state the second motor (61) selectively drives the pivot mount (81) relative to the drive housing (80) via the first load path and the second load path. The linear actuator assembly may comprise gearing (33, 34, 84, 64) between the first motor (31) and the first screw drive (35) and the second screw drive (65) such that both the first screw drive (35) and the second screw drive (65) may be driven by the first motor (31) in the first operation state and such that the first screw drive (35) and the second screw drive (65) are rotationally synchronized with each other in the first operation state. The linear actuator assembly may comprise gearing (63, 64, 84, 34) between the second motor (61) and the first screw drive (35) and the second screw drive (65) such that both the first screw drive (35) and the second screw drive (65) may be driven by the second motor (61) in the first operation state and such that the first screw drive (35) and second screw drive (65) are rotationally synchronized with each other in the first operation state. The gearing may comprise: a first motor gear (33) connected to a drive shaft (32) of the first motor (31); a second motor gear (63) connected to a drive shaft (62) of the second motor (61); a first drive gear (34) connected to a first shaft (37) of the first screw drive (35) and in rotational engagement with the first motor gear (33); a second drive gear (64) connected to a second shaft (67) of the second screw drive (65) and in rotational engagement with the second motor gear (63); and a synchronizing gear (84) in rotational engagement with both the first drive gear (34) and the second drive gear (64).

The first mount connection (38) may comprise a first pin joint connection with the pivot mount (81) comprising a first clevis (42) and a first clevis pin (43) and the first drive linkage comprising a first pin opening (44) configured to receive the first clevis pin (43), such that the pivot mount (81) is pivotally connected to the first drive linkage by the first pin joint connection. The second mount connection (68) may comprise a second pin joint connection with the pivot mount (81) comprising a second clevis (72) and a second clevis pin (73) and the second drive linkage comprising a second pin opening (74) configured to receive the second clevis pin (73), such that the pivot mount (81) is pivotally connected to the second drive linkage by the second pin joint connection. The first mount connection (38) may comprise a first spherical bearing (45) between the pivot mount (81) and the first drive linkage (35) and the second mount connection (68) may comprise a second spherical bearing (75) between the pivot mount (81) and the second drive linkage (65).

The actuator assembly may comprise a driven object (18) connected to the pivot mount (81) and a structure (16) connected to the drive housing (80) and the actuator assembly may be configured to impart a limited range of rotary motion to the driven object (18) about a rotary output driven axis (20) relative to the structure (16). The drive housing (80) may be connected to the structure (16) via a housing pivot connection (22). The first motor (31) and the second motor (61) may be supported by the drive housing (80). The driven object (18) may comprise an aircraft flight control surface. The flight control surface may be selected from a group consisting of a horizontal stabilizer, an elevator, a rudder, an aileron, a flap, a slat, and a spoiler. The flight control surface may be a horizontal stabilizer (18) and the structure may be a vertical stabilizer (16).

The actuator assembly may comprise a driven object connected to the drive housing (80) and a structure connected to the pivot mount (81) and the actuator assembly may be configured to impart a limited range of rotary motion to the driven object about a rotary output driven axis relative to the structure.

The first motor and the second motor may comprise a brushless DC permanent magnet motor. The fault may comprise wear or backlash in the first drive linkage or the second drive linkage above the fault threshold. The rotational threshold may be proportional to the fault threshold.

DETAILED DESCRIPTION OF THE EMBODIMENTS

Figure 1:
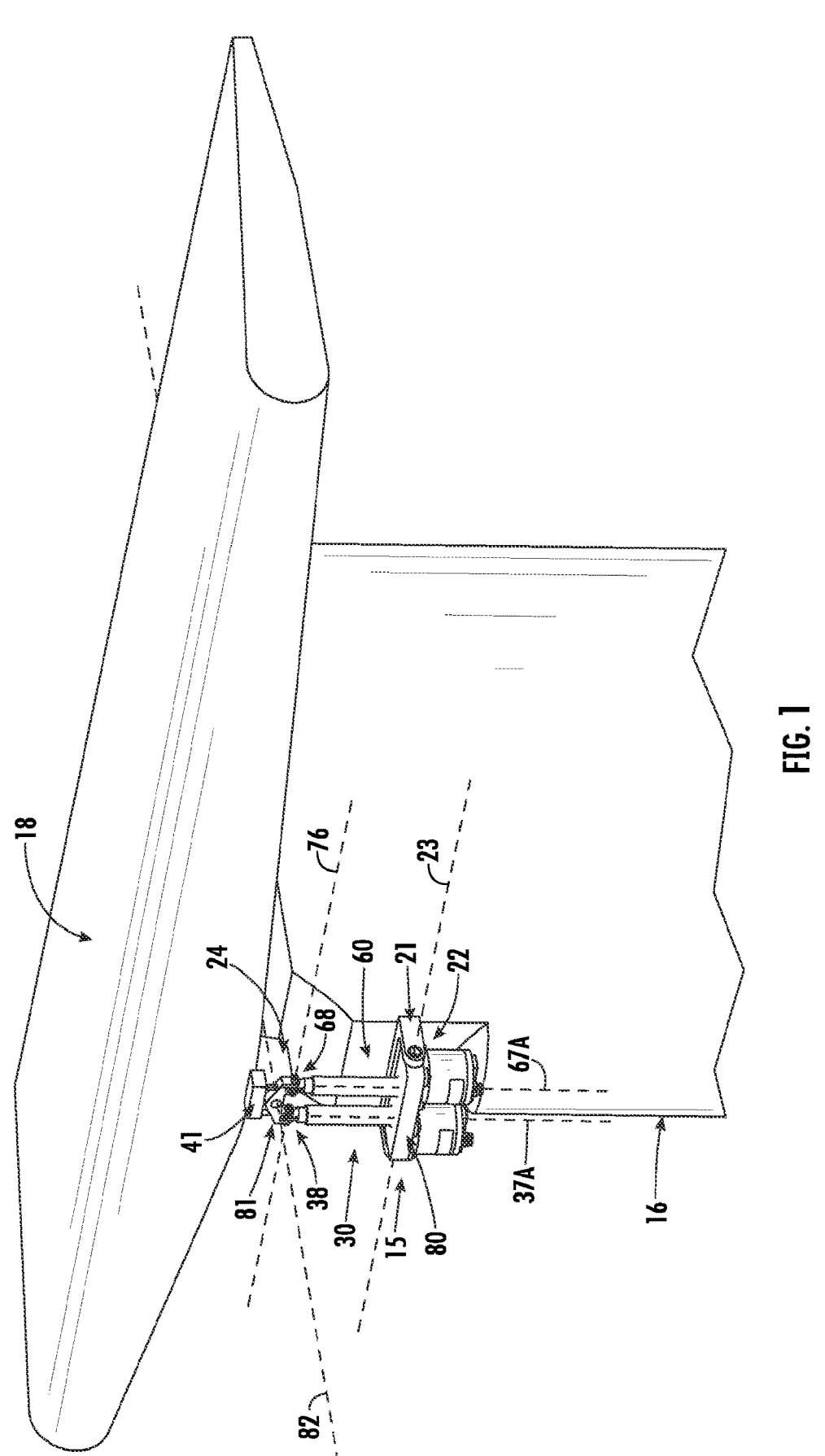
FIG. 1 is representative partial perspective view of an embodiment of the improved actuator assembly on the horizontal stabilizer trim of a tail of a winged aircraft.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

An improved redundant actuator assembly with fault detection is provided, a first embodiment of which is generally indicated at 15. As shown, assembly 15 generally includes first and second independently-driven screw drives 35 and 65 defining two independent load paths between housing 80 and pivot mount 81, first and second motors 31 and 61 configured to drive first and second drive screws 35 and 65, respectively, gearing 33, 34, 63, 64 and 84 between motors 31 and 61 and screw drives 35 and 65 configured such that both screw drives 35 and 65 may be driven by one motor and such that screw drives 35 and 65 are synchronized with each other, pivot mount 81 supporting screw drive 35 on a first side of pivot 82 and supporting screw drive 65 on a second side of pivot 82 and configured such that in normal operation mount 81 is in a force-balanced orientation, and first and second proximity sensors 40 and 70 positioned on either side of pivot 82 of pivot mount 81 and configured such that a force imbalance caused by a fault in one of the first or second drive linkages above a threshold causes pivot mount 81 to rotate out of its force-balanced orientation and to trigger one of proximity sensors 40 or 70, thereby detecting a fault.

Figure 2:
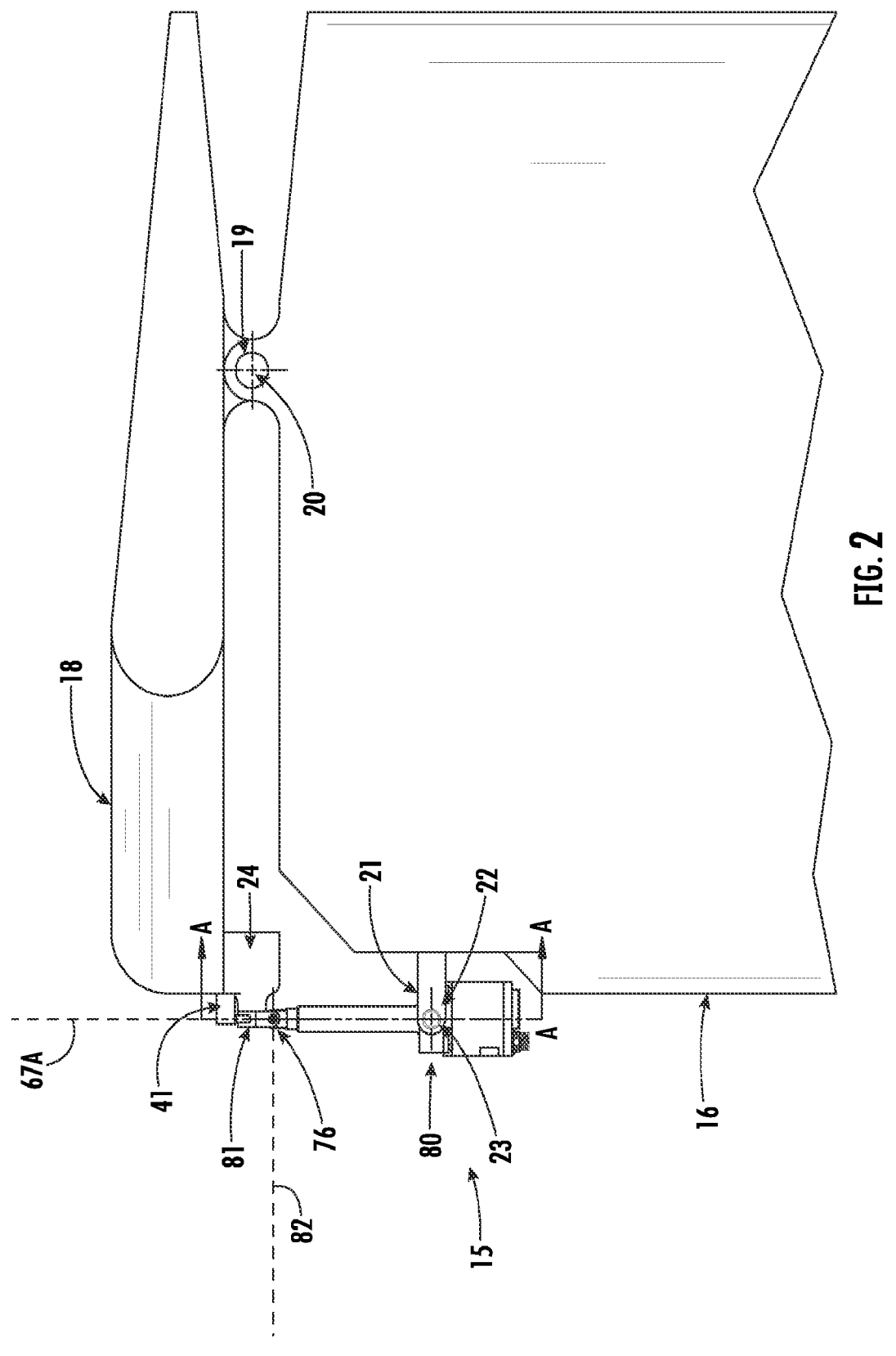
FIG. 2 is a representative side view of the actuator shown in FIG. 1.

As shown in FIGS. 1 and 2, the top end of each of screw drives 35 and 65 is coupled, via pivot mount 81, to mounting block 34 of flight control surface 18, which in this embodiment is a horizontal stabilizer of the tail of an aircraft. Via horizontal stab hinge 19, screw drives 35 and 65 and pivot mount 81 are configured to impart a limited range of rotary motion to horizontal stabilizer 18 about rotary hinge axis 20 relative to vertical stabilizer 16. The bottom end of each of screw drives 35 and 65 is coupled, via housing 80, to mounting bracket 21 of reference structure 16, which in this embodiment is a vertical stabilizer of the tail of an aircraft. In this embodiment, housing 80 is connected to vertical stabilizer 16 via housing pivot connection 22. As shown, each of screw drives 35 and 65 forms an independent load path such that a single failure does not result in the loss of both load paths.

Screw drive 35 generally comprises output piston 36 and shaft 37. Piston 36 is connected to pivot mount 81 at mount connection 38 and is translationally supported by drive housing 80 such that piston 36 may translate linearly relative to housing tube 80A but may not rotate relative to housing tube 80A. Shaft 37 is rotationally supported by drive housing 80 such that shaft 37 may rotate relative to housing tube 80A but may not translate linearly relative to housing tube 80A. The inner cylindrical bore of piston 36 is in threaded engagement with the top nut of shaft 37 such that piston 36 translates within a linear range of motion axially on center axis 37A relative to shaft 37 and drive housing 80 in response to relative rotation between shaft 37 and piston 36 about center axis 37A. Motor 31 is configured to drive rotation of shaft 37 about center axis 37A relative to drive housing 80. Screw drive 35 may thereby be operated as a mechanical linear actuator that translates rotational motion to linear motion.

Screw drive 65 generally comprises output piston 66 and shaft 67. Piston 66 is connected to pivot mount 81 at mount connection 68 and is translationally supported by drive housing 80 such that piston 66 may translate linearly relative to housing tube 80B but may not rotate relative to housing tube 80B. Shaft 67 is rotationally supported by drive housing 80 such that shaft 67 may rotate relative to housing tube 80B but may not translate linearly relative to housing tube 80B. The inner cylindrical bore of piston 66 is in threaded engagement with the top nut of shaft 67 such that piston 66 translates within a linear range of motion axially on center axis 67A relative to shaft 67 and drive housing 80 in response to relative rotation between shaft 67 and piston 66 about center axis 67A. Motor 61 is configured to drive rotation of shaft 67 about center axis 67A relative to drive housing 80. Screw drive 65 may thereby be operated as a mechanical linear actuator that translates rotational motion to linear motion.

Figure 3:
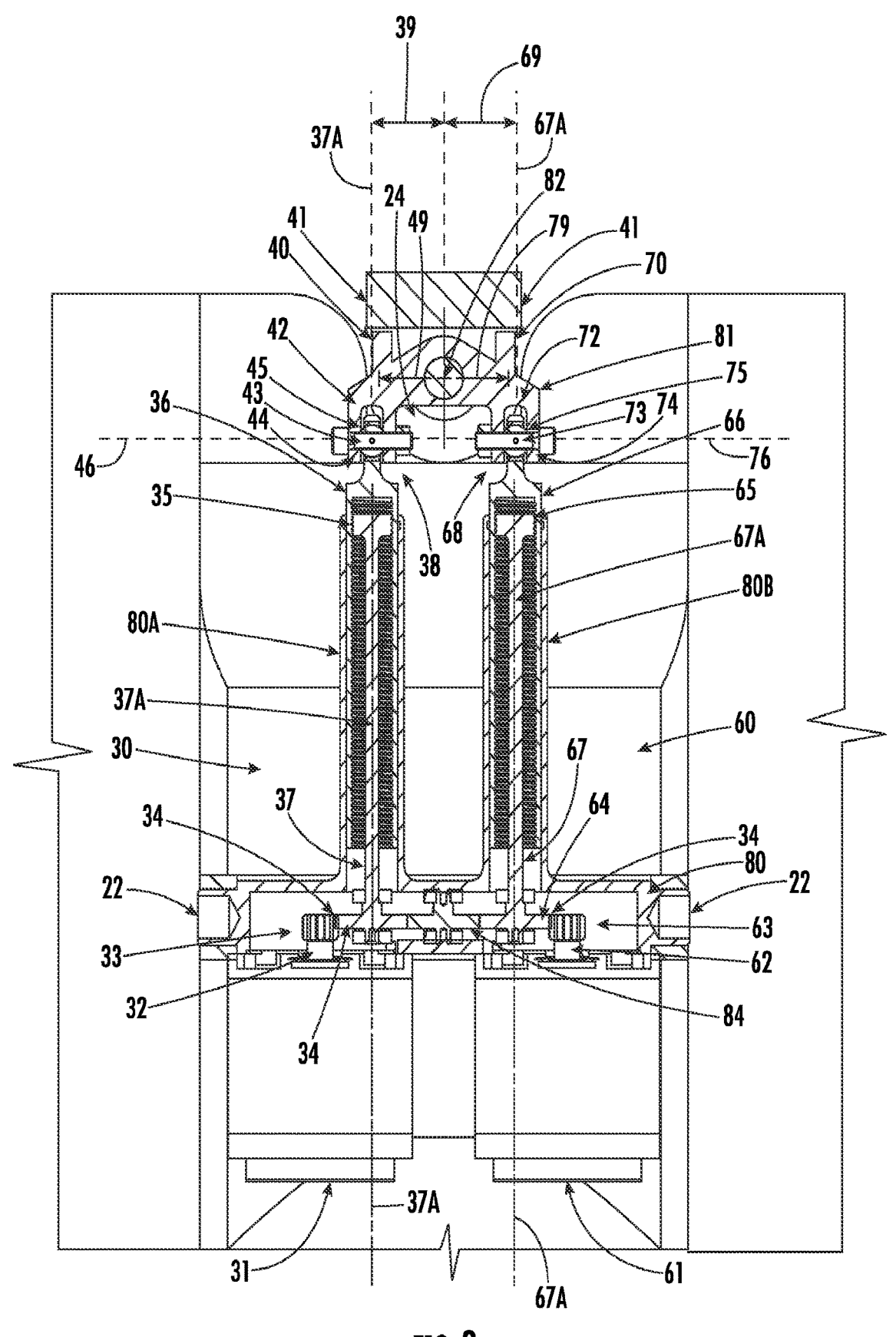
FIG. 3 is a longitudinal vertical cross-sectional view of the actuator shown in FIG. 2, taken generally on line A-A of FIG. 2.
Figure 4:
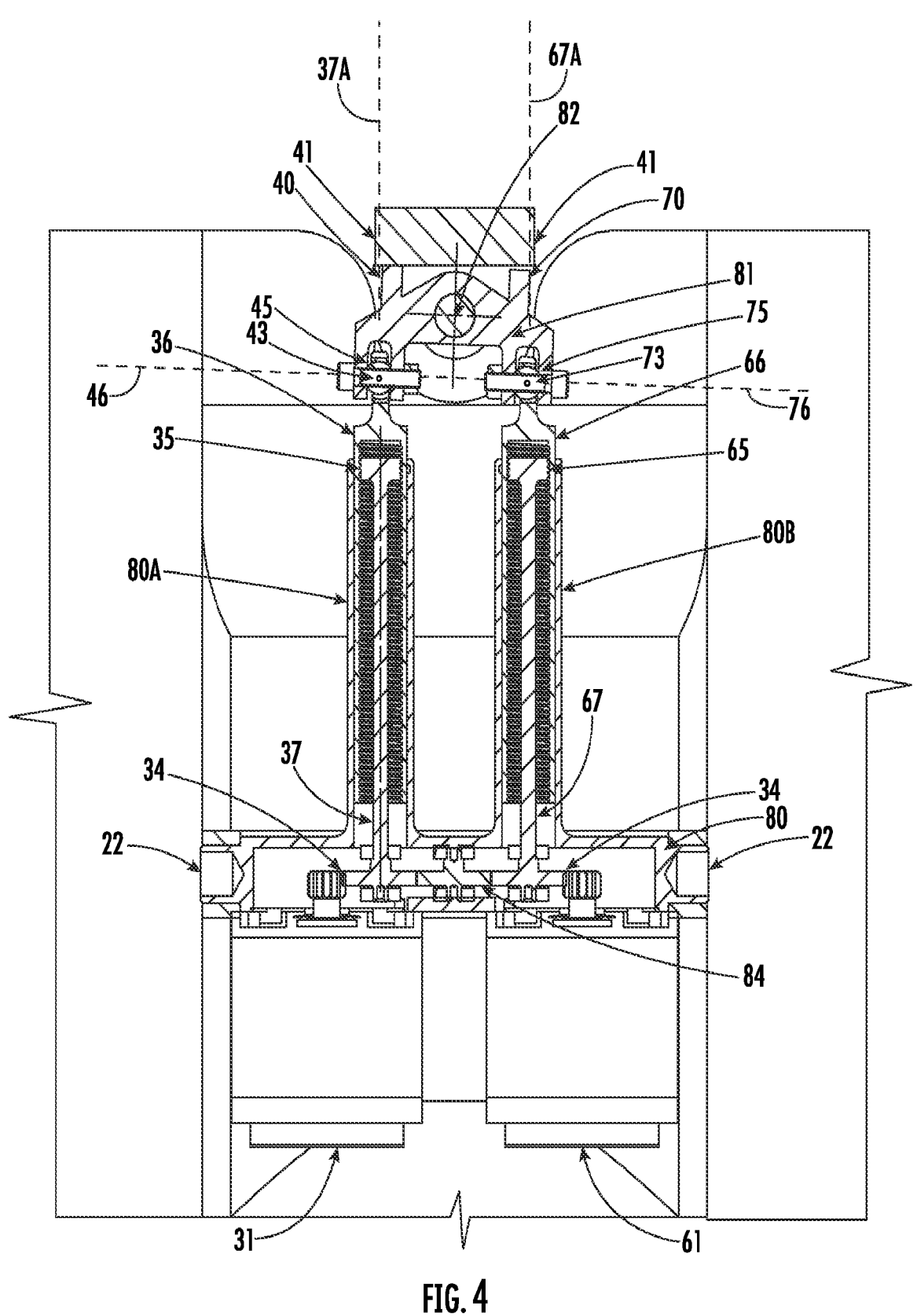
FIG. 4 is a view of the actuator shown in FIG. 3 in a fault detected unbalanced position.

As shown in FIGS. 3 and 4, shaft 37 of screw drive 35 includes bull gear 34 at its bottom end that is in meshed engagement with and rotationally driven by corresponding pinion 33 on output shaft 32 of motor 31. Bull gear 34 is also in meshed engagement with center idler gear 84. Similarly, shaft 67 of screw drive 65 includes bull gear 64 at its bottom end that is in meshed engagement with and rotationally driven by corresponding pinion 63 on output shaft 62 of motor 61. Bull gear 64 is also in meshed engagement with center idler gear 84. Idler gear 84 links the two separate load paths such that both drive screws 35 and 65 are synchronized or timed together and such that either left motor 31 or right motor 61 can drive both screw drives 35 and 65 (through such motors own direct gearing and through idler gear 84 for the opposite side screw drive). Thus, shaft 32 extends from motor 31 and terminates at gear 33 having externally facing teeth. Gear 33 is in meshed engagement with the externally facing teeth of reduction gear 34 fixed to shaft 37. Gear 33 is also in meshed engagement with the externally facing teeth of idler gear 84. Shaft 37 rotates about central axis 37A relative to housing 80 with rotation of motor shaft 32. Shaft 37 also rotates about central axis 37A relative to housing 80 with rotation of idler gear 84. Shaft 37 rotates about axis 37A opposite to the direction of rotation of motor shaft 32 about the motor axis as well as opposite to the direction of rotation of idler gear 84. Idler gear 84 rotates relative to housing 80 with rotation of motor output shaft 32 and screw drive shaft 37. Shaft 62 extends from motor 61 and terminates at gear 63 having externally facing teeth. Gear 63 is in meshed engagement with the externally facing teeth of reduction gear 64 fixed to shaft 67. Gear 63 is also in meshed engagement with the externally facing teeth of idler gear 84. Shaft 67 rotates about central axis 67A relative to housing 80 with rotation of motor shaft 62. Shaft 67 also rotates about central axis 67A relative to housing 80 with rotation of idler gear 84. Shaft 67 rotates about axis 67A opposite to the direction of rotation of motor shaft 62 about the motor axis as well as opposite to the direction of rotation of idler gear 84. Idler gear 84 rotates relative to housing 80 with rotation of motor output shaft 62 and screw drive shaft 67.

While in this embodiment the rotational couplings between motors 31 and 61 and screw drives 35 and 65 comprise meshed gear trains, it is contemplated that other geared combinations may be used and/or various alternative rotational couplings may be employed. For example, and without limitation, the screw drives may be mechanically linked to the motors via one or more belts, gears, pulleys, chains, sprockets, and/or any other types of suitable couplers configured to physically or mechanically link the subject elements.

Pivot or teeter-totter mount 81 is connected to mounting block 24 such that it may pivot about pivot axis 82 relative to mounting block 24 and sensor target 41 fixed to mounting block 24 above pivot mount 81. The top end of piston 36 of screw drive 35 is connected to pivot mount 81 at mount connection 38, which is offset on a first side of pivot 82 a perpendicular offset distance 39 from pivot axis 82. In this embodiment, connection 38 is a pin joint connection. Pivot mount 81 has a clevis-type first side arm 42 with clevis type pin 43 oriented about pivot axis 46. The top end of piston 36 comprise a corresponding opening 44 orientated about pivot axis 46 that is configured to receive clevis pin 43, such that pivot mount 81 is pivotally connected to piston 36 by pin joint connection 38. In this embodiment, connection 38 includes spherical bearing 45 between opening 44 in the end of piston 36 and pin 43 of pivot mount 81. Spherical bearing 45 is a rotary coupling about a coupling center between clevis 42 of pivot mount 81 and piston 36. Opening 44 in the end portion of piston 36 has a race with a spherical inner diameter surface orientated about the coupling center. Clevis pin 43 rotationally supports spherical bearing 45, which has an outer spherical diameter surface orientated about the coupling center. Spherical bearing 45 is retained in the race of the end portion of piston 36, with the outer surface of spherical bearing 45 in spherical sliding engagement with the inner surface of the race of piston 36. Thus, the race of piston 36 and the spherical bearing 45 of pivot mount 81 may rotate in at least two degrees of motion about the coupling center of connection 38 relative to each other. The coupling center of pivot connection 38 between pivot mount 81 and screw drive 35 is offset perpendicular distance 39 from pivot axis 82.

The top end of piston 66 of screw drive 65 is connected to pivot mount 81 at mount connection 68, which is offset on a first side of pivot 82 a perpendicular offset distance 69 from pivot axis 82. In this embodiment, connection 68 is a pin joint connection. Pivot mount 81 has a clevis-type first side arm 72 with clevis type pin 73 oriented about pivot axis 76. The top end of piston 66 comprise a corresponding opening 74 orientated about pivot axis 76 that is configured to receive clevis pin 73, such that pivot mount 81 is pivotally connected to piston 66 by pin joint connection 68. In this embodiment, connection 68 includes spherical bearing 75 between opening 74 in the end of piston 66 and pin 73 of pivot mount 81. Spherical bearing 75 is a rotary coupling about a coupling center between clevis 72 of pivot mount 81 and piston 66. Opening 74 in the end portion of piston 66 has a race with a spherical inner diameter surface orientated about the coupling center. Clevis pin 73 rotationally supports spherical bearing 75, which has an outer spherical diameter surface orientated about the coupling center. Spherical bearing 75 is retained in the race of the end portion of piston 66, with the outer surface of spherical bearing 75 in spherical sliding engagement with the inner surface of the race of piston 66. Thus, the race of piston 66 and the spherical bearing 75 of pivot mount 81 may rotate in at least two degrees of motion about the coupling center of connection 68 relative to each other. The coupling center of pivot connection 68 between pivot mount 81 and screw drive 65 is offset perpendicular distance 79 from pivot axis 82 opposite to offset distance 39 or connection 38. In this embodiment, axis 46 and axis 76 are coincident and offset distance 39 is the same distance as offset distance 69. While connections 38 and 68 comprise pin joint connections in this embodiment, it is contemplated that other various alternative rotational couplings or pivot joints may be employed. For example, and without limitation, spherical, gimbal or universal joint type couplings may be used as alternatives.

Motor 31 comprises a stator fixed relative to housing 80 and a rotor that is connected to output shaft 32 and driven to rotate about a drive axis relative to the stator. In this embodiment, motor 31 is a rotary brushless permanent magnet electric motor with the rotor having permanent magnets spaced around its inwardly-facing annular stator-facing surface and the stator having coils energized to drive the rotor and output shaft 32 about the motor axis in either rotational direction. Similarly, motor 61 comprises a stator fixed relative to housing 80 and a rotor that is connected to output shaft 62 and driven to rotate about a drive axis relative to the stator. In this embodiment, motor 61 is a rotary brushless permanent magnet electric motor with the rotor having permanent magnets spaced around its inwardly-facing annular stator-facing surface and the stator having coils energized to drive the rotor and output shaft 62 about the motor axis in either rotational direction.

Proximity sensors 40 and 70 are positioned on either side of pivot point 82 of pivot mount 81. Sensor 40 is offset on a first side of pivot 82 perpendicular distance 49 from pivot axis 82. Sensor 70 is offset on a second side of pivot 82 perpendicular offset distance 79 from pivot axis 82, with distances 49 and 79 being the same distance. As shown in FIGS. 1-3, in normal operation, when both load paths are providing equal force, pivot mount 81 is in a force-balanced orientation. Sensors 40 and 70 are each spaced on pivot mount 81 a selected distance from target 41 when pivot mount 81 is in the force-balanced orientation shown in FIG. 3. When both screw drive 35 and screw drive 65 are operating normally, pivot mount 81 is generally balanced and stays within a centered threshold, thereby not moving either sensor 40 or sensor 70 within a fault range of sensor target 41 on mounting block 24. Both screw drive 35 and screw drive 65 are providing substantially the same force to pivot mount 81 on each side of pivot axis 82, with the clockwise moment equaling the counterclockwise moment on pivot mount 81 about pivot axis 82. In this equilibrium orientation, sensor 40 and sensor 70 do not sense that mount 81 has pivoted too close to sensor target 41 one way or the other, which would indicate an unbalanced fault condition.

If, for example, screw drive 65 begins to exhibit wear or backlash above a threshold when motors 31 or 61 are driving pistons 36 and 66 upwards, the moment on pivot mount 81 about pivot axis 82 from screw drive 65 will no longer cancel the moment on pivot mount 81 about pivot axis 82 from screw drive 35 and pivot mount 81 will therefore rotate clockwise about pivot point 82, thereby causing proximity sensor 40 to move outside a threshold centered position relative to target 41 and within a fault range or even possibly into contact with sensor target 41, as shown in FIG. 4. As shown, in this unbalanced orientation, pin axis 46 is not perpendicular to shaft axis 37A and pin axis 76 is not perpendicular to shaft axis 67A. When such unbalanced orientation is detected by sensor 40, actuator 15 is commanded to a stop and safely hold position for the remainder of the flight. If, for example, screw drive 35 begins to exhibit wear or backlash above a threshold when motors 31 or 61 are driving pistons 36 and 66 upwards, pivot mount 81 will rotate counter-clockwise about pivot point 82, thereby causing proximity sensor 70 to move outside a threshold centered position relative to target 41 and within a fault range or even possibly into contact with sensor target 41. When such unbalanced orientation is detected by sensor 70, actuator 15 is commanded to a stop and safely hold position for the remainder of the flight. If, for example, screw drive 65 begins to exhibit wear or backlash above a threshold when motors 31 or 61 are pulling pistons 36 and 66 downwards, the moment on pivot mount 81 about pivot axis 82 from screw drive 65 will no longer cancel the moment on pivot mount 81 about pivot axis 82 from screw drive 35 and pivot mount 81 will therefore rotate counter-clockwise about pivot point 82, thereby causing proximity sensor 70 to move outside a threshold centered position relative to target 41 and within a fault range or even possibly into contact with sensor target 41. When such unbalanced orientation is detected by sensor 70, actuator 15 is commanded to a stop and safely hold position for the remainder of the flight. If, for example, screw drive 35 begins to exhibit wear or backlash above a threshold when motors 31 or 61 are pulling pistons 36 and 66 downwards, pivot mount 81 will rotate clockwise about pivot point 82, thereby causing proximity sensor 40 to move outside a threshold centered position relative to target 41 and within a fault range or even possibly into contact with sensor target 41. When such unbalanced orientation is detected by sensor 40, actuator 15 is commanded to a stop and safely hold position for the remainder of the flight. Thus, a force imbalance caused by a fault in one of the first or second drive linkages above a threshold causes pivot mount 81 to rotate out of its force-balanced orientation and to trigger proximity sensor 40 and/or 70, thereby detecting a fault and triggering a safety hold.

Proximity sensors 40 and 70 may be contact or contactless sensors, contact stop switches or other detectors. The proximity sensors may be positioned on the pivot mount or alternatively on the opposed structure. A proximity sensor may be positioned on either side of pivot 82 and in such proximity to pivot mount 81 that a force imbalance caused by a fault in one of the first or second load paths above a threshold causes pivot mount 81 to rotate out of its force-balanced orientation and to be detected by the sensor, thereby detecting a fault.

Actuator assembly 15 is a dual load path linear actuator with fault detection that may be used as an HSTA, which must be failsafe, meaning it will hold position following a failure in one of the dual load paths. The HSTA described herein is a simple solution to this problem, with far fewer parts, lower cost and less complexity. However, actuator assembly 15 may be arranged to act, for example, and without limitation, between other airfoil or aircraft flight control surfaces and the fuselage of an aircraft or other reference structures to adjust the orientation of the surface relative to the fuselage or other reference surface. For example, the flight control surface may be a stabilizer, an elevator, a rudder, an aileron, a flap, a slat, and a spoiler.

Several additions modifications can be made to the disclosed embodiments. For example, and without limitation, housing 80 may be attached to horizontal stabilizer 18 and pivot mount 81 may be attached to vertical stabilizer 16, with sensor target 41 positioned accordingly on vertical stabilizer 16 relative to sensors 40 and 70 on pivot mount 81. Therefore, while a form of the redundant actuator assembly with fault detection has been shown and described, and several modifications discussed, persons skilled in this art will readily appreciate that various additional changes may be made without departing from the scope of the invention as defined and differentiated by the following claims.

What is claimed is:

1. An actuator assembly configured to impart a range of motion to a driven object relative to a structure comprising:

a first sub-actuator comprising a first motor and a first drive linkage configured to be driven linearly relative to a drive housing;

a second sub-actuator comprising a second motor and a second drive linkage configured to be driven linearly relative to said drive housing;

a pivot mount connected to both said first drive linkage and said second drive linkage and configured to pivot about a pivot axis;

said pivot mount connected to said first drive linkage at a first mount connection offset a perpendicular first offset distance from said pivot axis;

said pivot mount connected to said second drive linkage at a second mount connection offset a perpendicular second offset distance from said pivot axis;

said first motor and said first drive linkage configured to provide a first load path between said drive housing and said pivot mount;

said second motor and said second drive linkage configured to provide a second load path between said drive housing and said pivot mount that is different from said first load path;

said first mount connection supporting said first drive linkage and said second mount connection supporting said second drive linkage so that in a first operation state said pivot mount is in a force-balanced orientation about said pivot axis;

a synchronizing coupling in mechanical engagement with both said first drive linkage and said second drive linkage separate from said pivot mount and so as to couple said first load path and said second load path such that said first drive linkage and said second drive linkage are synchronized and driven together linearly between said first motor and said first mount connection and said second motor and said second mount connection, respectively, by said first motor and/or said second motor in said first operation state;

a proximity detector positioned to detect when said pivot mount rotates about said pivot axis above a rotation threshold out of said force-balanced orientation; and wherein a force imbalance on said pivot mount caused by a fault in one of said first drive linkage or said second drive linkage above a fault threshold is detected by said proximity detector.

2. The actuator assembly set forth in claim 1, wherein said proximity detector comprises a contact detector configured so that a force imbalance caused by a fault in one of the first or second drive linkages above said fault threshold causes said pivot mount to rotate out of said force-balanced orientation above said rotation threshold and to contact said contact detector, thereby detecting said fault.

3. The actuator assembly set forth in claim 2, comprising a driven object connected to said pivot mount and wherein said proximity detector comprises a proximity sensor disposed on either said pivot mount or said driven object and a sensor target disposed on the other of said pivot mount or said driven object.

4. The actuator assembly set forth in claim 1, wherein:

said first drive linkage comprises a first screw drive and said second drive linkage comprises a second screw drive; and said first motor is configured to selectively rotate said first screw drive and said second motor is configured to selectively rotate said second screw drive.

5. The actuator assembly set forth in claim 4, wherein:

said first screw drive comprises a first output piston connected to said pivot mount at said first mount connection and translationally supported by said drive housing;

said first screw drive comprises a first shaft rotationally supported by said drive housing;

said first output piston is in engagement with said first shaft such that said first output piston translates within a linear range of motion axially on a first center axis relative to said first shaft and said drive housing in response to relative rotation between said first shaft and said first output piston about said first center axis; and said first motor is configured to drive rotation of said first shaft about said first center axis relative to said drive housing.

6. The actuator assembly set forth in claim 5, wherein:

said second screw drive comprises a second output piston connected to said pivot mount at said second mount connection and translationally supported by said drive housing;

said second screw drive comprises a second shaft rotationally supported by said drive housing;

said second output piston is in engagement with said second shaft such that said second output piston translates within a linear range of motion axially on a second center axis relative to said second shaft and said drive housing in response to relative rotation between said second shaft and said second output piston about said second center axis; and said second motor is configured to drive rotation of said second shaft about said second center axis relative to said drive housing.

7. The linear actuator assembly set forth in claim 6, wherein said first center axis and said second center axis are substantially parallel.

8. The actuator assembly set forth in claim 7, wherein said pivot axis and said first center axis are substantially perpendicular.

9. The actuator assembly set forth in claim 8, wherein said first offset distances is substantially the same distance as said second offset distance.

10. The actuator assembly set forth in claim 4, wherein:

said first motor is connected to both said first drive linkage and said second drive linkage so that in said first operation state said first motor selectively drives said pivot mount relative to said drive housing via said first load path and said second load path; and said second motor is connected to both said first drive linkage and said second drive linkage so that in said first operation state said second motor selectively drives said pivot mount relative to said drive housing via said first load path and said second load path.

11. The linear actuator assembly set forth in claim 10, comprising gearing between the first motor and said first screw drive and said second screw drive such that both said first screw drive and said second screw drive may be driven by said first motor in said first operation state and such that said first screw drive and said second screw drive are rotationally synchronized with each other in said first operation state.

12. The linear actuator assembly set forth in claim 11, comprising gearing between the second motor and said first screw drive and said second screw drive such that both said first screw drive and said second screw drive may be driven by said second motor in said first operation state and such that said first screw drive and second screw drive are rotationally synchronized with each other in said first operation state.

13. The linear actuator assembly set forth in claim 12, wherein said gearing comprises:

a first motor gear connected to a drive shaft of said first motor;

a second motor gear connected to a drive shaft of said second motor;

a first drive gear connected to a first shaft of said first screw drive and in rotational engagement with said first motor gear;

a second drive gear connected to a second shaft of said second screw drive and in rotational engagement with said second motor gear; and said synchronizing coupling comprises a synchronizing gear in rotational engagement with both said first drive gear and said second drive gear.

14. The actuator assembly set forth in claim 1, wherein said first mount connection comprises a first pin joint connection with said pivot mount comprising a first clevis and a first clevis pin and said first drive linkage comprising a first pin opening configured to receive said first clevis pin, such that said pivot mount is pivotally connected to said first drive linkage by said first pin joint connection.

15. The actuator assembly set forth in claim 14, wherein said second mount connection comprises a second pin joint connection with said pivot mount comprising a second clevis and a second clevis pin and said second drive linkage comprising a second pin opening configured to receive said second clevis pin, such that said pivot mount is pivotally connected to said second drive linkage by said second pin joint connection.

16. The actuator assembly set forth in claim 15, wherein said first mount connection comprises a first spherical bearing between said pivot mount and said first drive linkage and said second mount connection comprises a second spherical bearing between said pivot mount and said second drive linkage.

17. The actuator assembly set forth in claim 1, comprising a driven object connected to said pivot mount and a structure connected to said drive housing and wherein said actuator assembly is configured to impart a limited range of rotary motion to said driven object about a rotary output driven axis relative to said structure.

18. The actuator assembly set forth in claim 17, wherein said drive housing is connected to said structure via a housing pivot connection.

19. The actuator assembly set forth in claim 18, wherein said first motor and said second motor are supported by said drive housing.

20. The actuator assembly set forth in claim 17, wherein said driven object comprises an aircraft flight control surface.

21. The actuator assembly set forth in claim 20, wherein said flight control surface is selected from a group consisting of a horizontal stabilizer, an elevator, a rudder, an aileron, a flap, a slat, and a spoiler.

22. The actuator assembly set forth in claim 20, wherein said flight control surface is a horizontal stabilizer and said structure is a vertical stabilizer.

23. The actuator assembly set forth in claim 1, comprising a driven object connected to said drive housing and a structure connected to said pivot mount and wherein said actuator assembly is configured to impart a limited range of rotary motion to said driven object about a rotary output driven axis relative to said structure.

24. The actuator system as set forth in claim 1, wherein said fault comprises wear or backlash in said first drive linkage or said second drive linkage above said fault threshold.

25. The actuator system as set forth in claim 1, wherein said rotational threshold is proportional to said fault threshold.

26. An actuator assembly configured to impart a range of motion to a driven object relative to a structure comprising:

a first sub-actuator comprising a first motor and a first drive linkage configured to be driven linearly relative to a drive housing;

a second sub-actuator comprising a second motor and a second drive linkage configured to be driven linearly relative to said drive housing;

a pivot mount connected to both said first drive linkage and said second drive linkage and configured to pivot about a pivot axis;

said pivot mount connected to said first drive linkage at a first mount connection offset a perpendicular first offset distance from said pivot axis;

said pivot mount connected to said second drive linkage at a second mount connection offset a perpendicular second offset distance from said pivot axis;

said first motor and said first drive linkage configured to provide a first load path between said drive housing and said pivot mount;

said second motor and said second drive linkage configured to provide a second load path between said drive housing and said pivot mount that is different from said first load path;

said first mount connection supporting said first drive linkage and said second mount connection supporting said second drive linkage so that in a first operation state said pivot mount is in a force-balanced orientation about said pivot axis;

a proximity detector positioned to detect when said pivot mount rotates about said pivot axis above a rotation threshold out of said force-balanced orientation;

said first drive linkage comprising a first screw drive and said second drive linkage comprising a second screw drive;

said first motor configured to selectively rotate said first screw drive and said second motor configured to selectively rotate said second screw drive;

said first motor connected to both said first drive linkage and said second drive linkage so that in said first operation state said first motor selectively drives said pivot mount relative to said drive housing via said first load path and said second load path;

said second motor connected to both said first drive linkage and said second drive linkage so that in said first operation state said second motor selectively drives said pivot mount relative to said drive housing via said first load path and said second load path;

gearing between the first motor and said first screw drive and said second screw drive such that both said first screw drive and said second screw drive may be driven by said first motor in said first operation state and such that said first screw drive and said second screw drive are rotationally synchronized with each other in said first operation state;

gearing between the second motor and said first screw drive and said second screw drive such that both said first screw drive and said second screw drive may be driven by said second motor in said first operation state and such that said first screw drive and second screw drive are rotationally synchronized with each other in said first operation state;

said gearing comprising:

a first motor gear connected to a drive shaft of said first motor;

a second motor gear connected to a drive shaft of said second motor;

a first drive gear connected to a first shaft of said first screw drive and in rotational engagement with said first motor gear;

a second drive gear connected to a second shaft of said second screw drive and in rotational engagement with said second motor gear; and a synchronizing gear in rotational engagement with both said first drive gear and said second drive gear; and wherein a force imbalance on said pivot mount caused by a fault in one of said first drive linkage or said second drive linkage above a fault threshold is detected by said proximity detector.

* * * * *